(12) United States Patent
Venturi et al.

(10) Patent No.: US 11,103,877 B2
(45) Date of Patent: Aug. 31, 2021

(54) CONTROL METHOD OF A TREATMENT PLANT OF ELEMENTS TO BE RECYCLED OR DISPOSED AND A TREATMENT PLANT OF ELEMENTS TO BE RECYCLED OR DISPOSED

(71) Applicant: CAMS S.r.l., Castel San Pietro Terme (IT)

(72) Inventors: Marco Venturi, Bologna (IT); Mauro Biavati, Ferrara (IT)

( * ) Notice: Subject to any disclaimer, the term of this patent is extended or adjusted under 35 U.S.C. 154(b) by 155 days.

(21) Appl. No.: 16/488,620

(22) PCT Filed: Feb. 22, 2018

(86) PCT No.: PCT/IB2018/051095
§ 371 (c)(1),
(2) Date: Aug. 26, 2019

(87) PCT Pub. No.: WO2018/158662
PCT Pub. Date: Sep. 7, 2018

(65) Prior Publication Data
US 2020/0023376 A1  Jan. 23, 2020

(30) Foreign Application Priority Data

Mar. 2, 2017  (IT) .................. 102017000023345

(51) Int. Cl.
*B02C 25/00*  (2006.01)
*B02C 4/28*  (2006.01)
(Continued)

(52) U.S. Cl.
CPC .............. *B02C 25/00* (2013.01); *B02C 4/286* (2013.01); *B02C 4/32* (2013.01); *B02C 4/42* (2013.01);
(Continued)

(58) Field of Classification Search
CPC ..... B02C 21/02; B02C 21/005; B02C 21/026; B02C 21/002; B02C 4/32; B02C 4/42;
(Continued)

(56) References Cited

U.S. PATENT DOCUMENTS 3,480,212 A * 11/1969 Schubert ................. B02C 25/00
                                                          241/34
3,647,150 A *  3/1972 Stephanek ............. B02C 23/08
                                                          241/75
(Continued)

FOREIGN PATENT DOCUMENTS

AU      2009264088 A1 * 12/2009 ............. B02C 21/00
WO      2004011159       2/2004

*Primary Examiner* — Gregory D Swiatocha
*Assistant Examiner* — Bobby Yeonjin Kim
(74) *Attorney, Agent, or Firm* — Themis Law

(57) ABSTRACT

A control method of a treatment plant for elements to be recycled or disposed of, having a crushing roll to reduce the size of the elements to be recycled or disposed of, and a screen operatively arranged upstream of the crushing roll to enable passage therethrough only of elements having a size larger than a predetermined size, includes the steps of measuring the current absorbed by the crushing roll; comparing the measured current value to a first predetermined value; and reducing the vibrations of the screen, if the measured current exceeds the first predetermined value.

3 Claims, 2 Drawing Sheets

(51) Int. Cl.
 *B02C 23/08* (2006.01)
 *B02C 21/02* (2006.01)
 *B02C 4/32* (2006.01)
 *B02C 4/42* (2006.01)
 *B02C 23/12* (2006.01)
 *B02C 4/08* (2006.01)

(52) U.S. Cl.
 CPC .............. *B02C 21/02* (2013.01); *B02C 23/08* (2013.01); *B02C 23/12* (2013.01); *B02C 4/08* (2013.01)

(58) Field of Classification Search
 CPC ......... B02C 4/286; B02C 23/02; B02C 23/12; B02C 23/08; B02C 18/2241; B02C 18/225; B02C 25/00
 See application file for complete search history.

(56) References Cited

U.S. PATENT DOCUMENTS

| | | | |
|---|---|---|---|
| 6,119,967 A | 9/2000 | Nakayama | |
| 6,259,222 B1 * | 7/2001 | Kira | B02C 25/00 241/35 |
| 7,938,272 B2 * | 5/2011 | Antila | B07B 1/005 209/247 |
| 2011/0210083 A1 * | 9/2011 | Scott | B01D 33/0376 210/785 |
| 2012/0137904 A1 * | 6/2012 | Vandewinckel | B30B 9/325 100/98 R |
| 2012/0175443 A1 * | 7/2012 | Neunzert | B02C 25/00 241/30 |
| 2014/0263777 A1 | 9/2014 | Anderson | |

* cited by examiner

CONTROL METHOD OF A TREATMENT PLANT OF ELEMENTS TO BE RECYCLED OR DISPOSED AND A TREATMENT PLANT OF ELEMENTS TO BE RECYCLED OR DISPOSED

DEFINITIONS

In the present invention, the term "elements to be recycled or disposed of" means construction residual materials, road residual materials, foundry wastes, mineral processing wastes, glass processing wastes, plastic processing wastes, or the like.

FIELD OF APPLICATION

The present invention is generally applicable to the technical field of the disposal of processing or dismantling residues of buildings, objects, plants, and refers to the treatment of elements to be recycled or disposed of such as debris deriving from the demolition of buildings, or from the removal or reconstruction of different works, or the like, residues from metals, plastics, or glass processing, or the like.

More in detail, the present invention relates to a treatment plant for elements to be recycled or disposed of in order to reduce their size.

STATE OF THE ART

Even partial demolition of buildings due to restructuring or due to destructive events as well as the rebuilding of different works or other human works generates typically rubble having large sizes. They must obviously be disposed of, and often their size, combined with the corresponding weight they have, make this disposal complex, and sometimes very difficult.

In this sense, different types of machines for reducing the size of the rubble are known. First of all, the rubble crushers are known that allow to reduce large slabs, portions of beams or the like, in boulders of smaller dimensions.

However, it is generally necessary that the material from the reducing treatment is particularly compact, and similar, for example, to sand or, at least, to pebbles. In order to achieve this, screenings and crushing rolls are generally used, the operation of which allows to properly chop the residue obtained from a crusher.

Since the operations of loading of the crusher and the unloading of the crushed material, and of loading of a screen and loading of a crushing roll require time and the intervention of a specialized workmanship, in order to optimize the processing and reduce the costs, machines or treatment plants have been designed for elements to be recycled or disposed of, which incorporate or have series of several processing stations such as crushers, screens and crushing rolls. In this sense, they typically also include conveyor belts for transferring the material from one station to another.

These machines and plants, however, are subject to working interruptions or failure and, in any case, to the continuous monitoring and intervention of personnel.

In addition, it is also known that the interruptions of the various work stations takes a few seconds to completely stop the motors and then to restart them. Since the machine downtime can occur various times in a day's work due to the mixed composition of the residue to be treated, it follows that at the end of the day the lack in productivity becomes significant.

Typically, the crushing roll is the last station of the line and is the one that, in the event of problems, is likely to cause the blockage of all the other stations.

In fact, for example, in the case in which an excessively sized or particularly tough material arrive to the crushing roll, the same tends to decrease its operability, or also to be stopped, resulting in the unacceptable increase of the material that accumulates thereon. In this case, it is therefore necessary to stop the transfer of the same from the upstream plant.

Therefore, the result is the complete shut-down of the machine or plant with a strong decrease in the yield thereof.

PRESENTATION OF THE INVENTION

Object of the present invention is to overcome at least partially the drawbacks noted above, providing a treatment plant for elements to be recycled or disposed of which allows reducing, if not eliminating at all, the risk of having to stop it during processing.

Within the scope of this general purpose, a particular object is to avoid that a possible accumulation of material on the crushing roll results in, if not in particular cases, the complete shut-down of all the stations of the plant.

Another object of the invention is to provide a treatment plant which allows to avoid or minimize the presence of specialized personnel who monitor its operation.

In other words, an object of the present invention is to provide a treatment plant for materials to be recycled or disposed, which has a processing yield higher than the known equivalent plants so as to minimize the costs in terms of personnel to be dedicated to its operation and in economic terms.

Such aims, as well as others which will be clearer below, are achieved by a control method of a treatment plant for elements to be recycled or disposed of according to the following claims, which are to be considered as an integral part of this patent.

In particular, the plant controlled according to the method of the invention comprises at least one crushing roll for a reduction in size of the elements to be recycled or disposed, and at least one screen to allow passage to the crushing roll only of residues having a size greater than predetermined sizes.

With the plant thus configured, the method of the invention comprises a measurement step, preferably but not necessarily by means of appropriate amperometric sensors, of the current absorbed by the crushing roll.

Then there is provided a comparison step of the measured value to a first predetermined value that corresponds to a pre-alarm value. If the comparison shows a current absorption higher than the pre-alarm value, then there is a step of reducing the vibrations of the screen.

Since the current consumption of the crushing roll is proportional to the work it has to perform, in the case a material that is not suitable to be treated is present thereon and which slows down the production of the crushing roll, the current absorption indicates the need to slow down the transfer of new material in order to prevent the crushing roll from being stopped due to excessive loading.

The slowing down of the screen, therefore, advantageously allows to simply slow down the production of the treatment plant without the need to stop it.

It is obvious, therefore, that in this way the productivity of the plant, even if it comprises further upstream processing stations, is increased compared to the equivalent known plants, since situations that require the total shut-down of all the stations are reduced.

From the above, it is evident that said objects are achieved by a treatment plant for elements to be recycled or disposed of, comprising:

at least one crushing roll for a reduction in size of the elements to be recycled or disposed of;

at least one screen operatively arranged upstream of said crushing roll to allow passage to said crushing roll only to residues having a size larger than predetermined sizes;

said crushing roll also comprising:

one or more first amperometric sensors for measuring the current consumption of said crushing roll;

at least one control circuit operatively connected to said first amperometric sensors and at least to said screen to decrease the vibration value in case of current measurement higher than a first predetermined value.

Advantageously, inter alia, the presence of the control circuit allows to reduce, and possibly eliminate at all, the need for the presence of personnel in charge of controlling and managing the plant of the invention with respect to what happens for the known equivalent plants.

This still allows, advantageously, to further increase the yield of the plant according to the invention by reducing operating costs.

BRIEF DESCRIPTION OF THE DRAWINGS

Further features and advantages of the invention will be more apparent in light of the detailed description of some preferred, but not exclusive, embodiments of a method of controlling a treatment plant for elements to be recycled or disposed of according to the invention, illustrated by way of non-limiting example with the aid of the accompanying drawings tables, wherein.

DETAILED DESCRIPTION OF AN EXEMPLARY PREFERRED EMBODIMENT OF THE INVENTION

As previously mentioned, object of the patent is both a controlling method of a treatment plant for elements to be recycled or disposed, and the plant itself.

Figure 1:
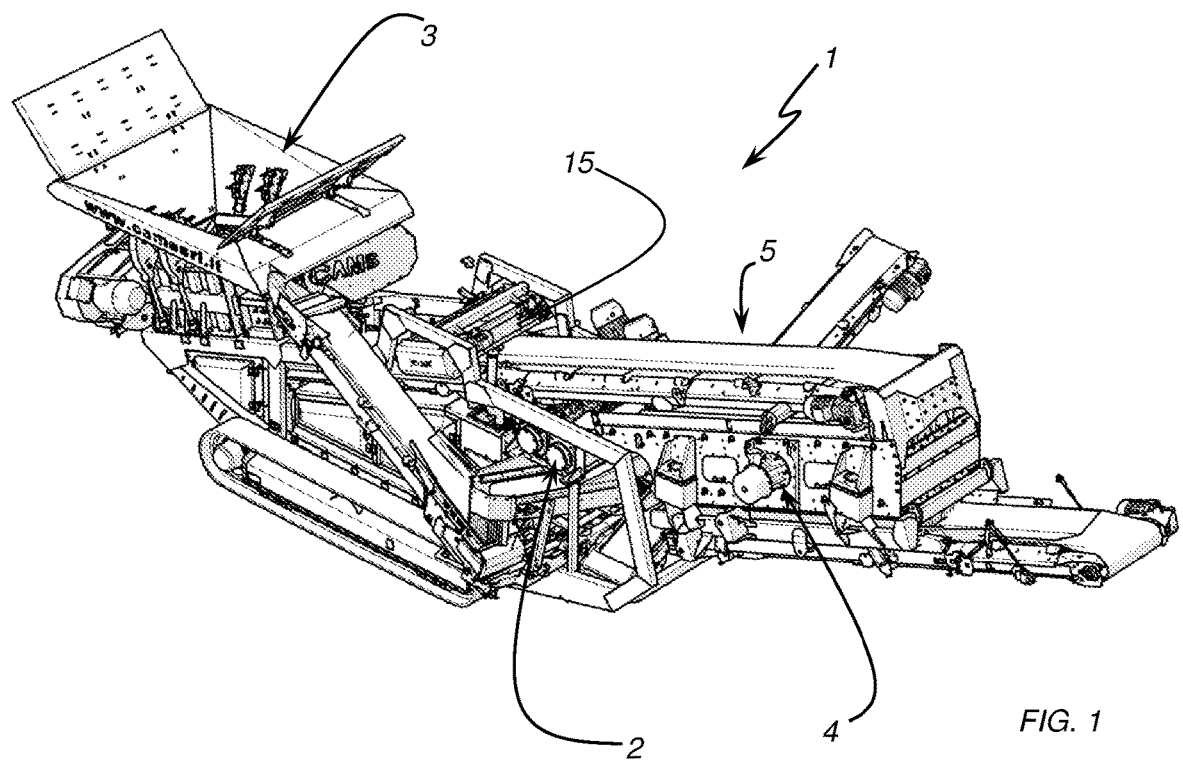
FIG. 1 represents a plant for processing elements to be recycled or disposed of according to the invention in an axonometric view.
Figure 2:
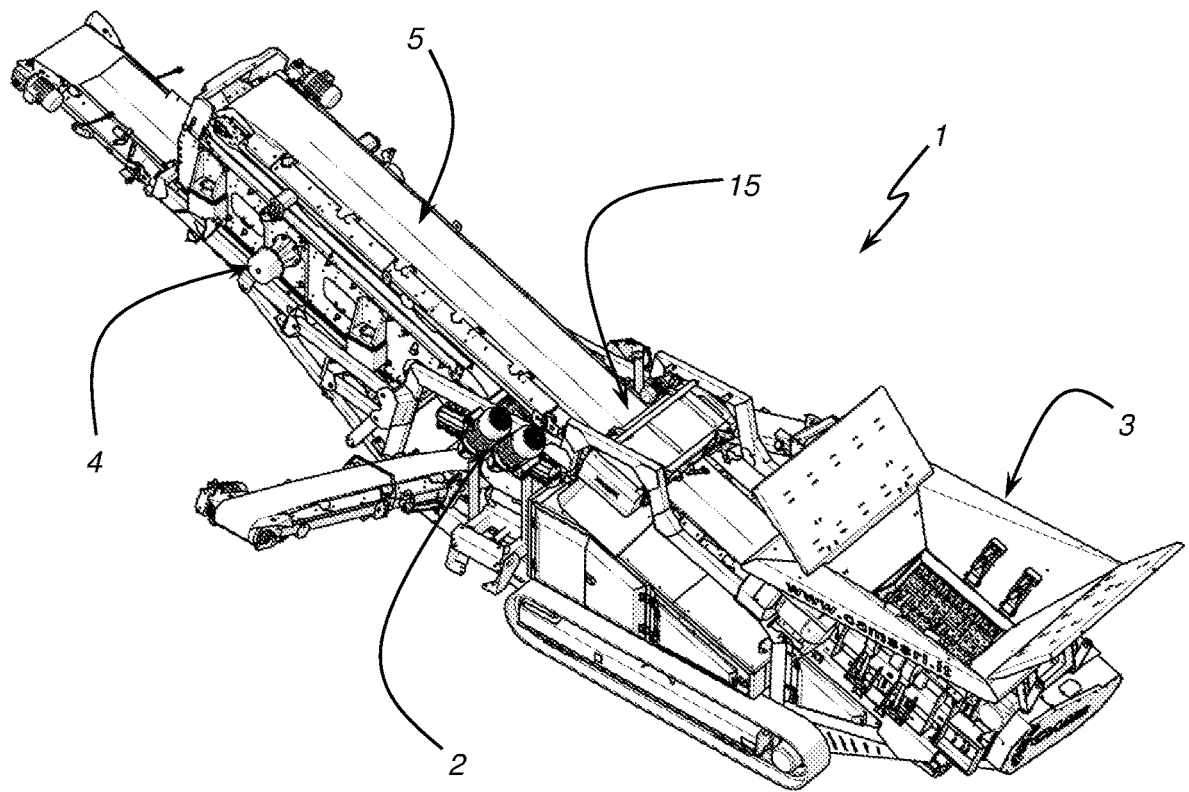
FIG. 2 represents a further axonometric view of the plant of FIG. 1.

In this sense, with reference to the figures above, and in particular to FIGS. 1 and 2, a treatment plant 1 for elements to be recycled or disposed of is described, which is typically usable for the reduction of such residues to a resulting material having a size like to sand or, at most, to pebbles.

For this reason, the plant 1 of the invention comprises a crushing roll 2 for a reduction in size of the residues.

Typically, however, the size of the residues is often particularly large so that, according to an aspect of the invention, the plant also comprises a crusher 3 for reducing the size of the residues.

Advantageously, therefore, the plant 1 can comprise two or more residue crushing stations to extend the type of residues to be treated.

According to another aspect of the invention, a screen 4 is interposed operatively upstream of the crushing roll 2, and downstream of the crusher 3, if present, to allow passage to the crushing roll 2 only to residues having a size larger than predetermined sizes. In this way, advantageously, the likelihood that the crushing roll 2 must devote time to the processing of material already reduced in size is reduced.

Downstream of the crushing roll 2 there is a recirculation circuit whose function is to bring the treated material back to the screen 4 so as to ensure that, in the case of the non-conforming material 2 coming out of the crushing roll 2, it undergoes further processing by the crushing roll 2 itself.

In order to correctly manage the flow to the screen 4 of the residue, a conveyor belt 5 is typically, but not necessarily, arranged upstream of the same. The latter is particularly advantageous if the plant 1 also includes the crusher 3.

Figure 3:
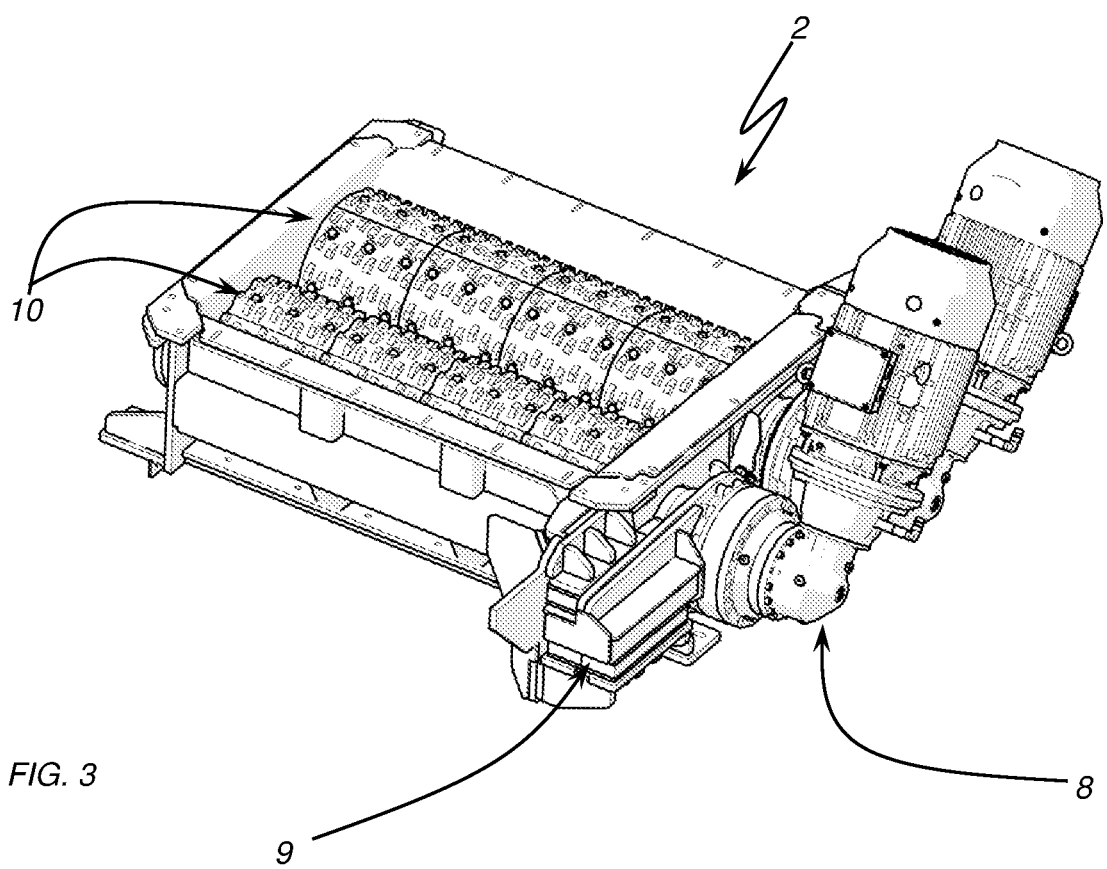
FIGS. 3 and 4 represent details of the plant of FIG. 1.

According to another aspect of the invention, the plant 1 comprises, as can also be seen in the detail in FIG. 3, a first amperometric sensor 8 for measuring the current consumption of the crushing roll 2, and a control circuit 9 operatively connected to the first amperometric sensor 8 and to the screen 4 to decrease the vibration value in case of a current measurement higher than a first predetermined value.

Advantageously, therefore, in case the crushing roll 2 is subjected to an excessive load due to excessively large or too tough residuals, a measure of the current absorbed by it can detect this phenomenon.

Still advantageously, the consequent deceleration of the loading of further residue, obtained by decreasing the vibration speed of the screen 4, avoids the crushing roll 2 from being stopped due to an excessive loading.

In other words, in the event of an excessive load of the crushing roll 2, the slowing down of the screen 4 allows, advantageously, to simply slow down the production of the plant 1 without the need to stop it.

In this way, still advantageously, the productivity of the plant 1 is increased with respect to the known equivalent plants, since the situations which require it to stop are reduced.

Still advantageously, the presence of the control circuit 9 allows to reduce, and possibly eliminate at all, the need for the presence of personnel in charge of controlling and managing the plant 1 of the invention with respect to what happens for the known equivalent plants.

This still allows, advantageously, to further increase the yield of the plant 1 according to the invention by reducing operating costs.

Obviously, the number of crushers, conveyor belts, screens and crushing rolls are non-limiting characteristics of the invention, since it can be any number. Likewise, neither the number of amperometric sensors nor the number of control circuits should be considered as limiting.

As previously mentioned, the object of the present patent is also the method of managing the treatment plant 1 described above.

In particular, according to an aspect of the invention, it comprises a step of measuring the current absorbed by the crushing roll 2 and a step of comparing the current value measured to a first predetermined value, which is a pre-alarm threshold.

If the comparison provides a value of absorbed current higher than this pre-alarm threshold, than there is a step of reducing the vibrations of the screen 4 so as to allow the crushing roll 2 to dispose the excess material more easily and restore the correct operation of the plant 1.

Since the screen 4 could in turn be subjected to excessive load, the method of the invention also comprises a step of decreasing the feed speed of the conveyor belt 5.

The above leads, as mentioned, to a slowdown in the productivity of the plant 1. However, if it continued at an unchanged pace, the operators would then be forced to perform a downtime, thus reducing overall productivity thereof.

If the current absorption by the crushing roll 2 falls below the first predetermined value, the optimal working speeds of the various stations of the plant 1 can be restored.

According to another aspect of the invention, if there is a moment in which the measured current is greater than a second predetermined value, higher than the first one (alarm threshold), that there is a step of stopping the screen 4, the conveyor belt 5 and the crusher 3. In other words, in the case the crushing roll 2 is in a critical situation, it is stopped in conjunction with all the upstream processing stations. Advantageously, this allows to manage the alarm situation.

According to a further aspect of the invention, moreover, at the same time as this stopping step there is a first inversion step of the operation of the crushing roll 2. In fact, the alarm situation could indicate the blockage by a material too tough therewithin. The inversion of the processing could allow the release of this material from the crushing roll 2, releasing it.

Subsequently, the correct working direction of the crushing roll 2 is restored and the current absorbed by it is checked. In case the values are back in the norm, the normal functionality of all the processing stations of the plant 1 is restored.

Otherwise the inversion step is repeated several times. Obviously, even the number of times in which this repetition occurs can be any number, without any limit for the present invention.

If this is not sufficient, according to another aspect of the invention, the method also comprises a step of removing the rotary shafts 10 of the crushing roll 2. In this way, the downstream output of the material being processed is favoured, even if it has an excessive size.

If even this step is not sufficient to restore acceptable absorbed current values, the method of the invention comprises a second inversion step of the processing of the crushing roll 2, which can also be repeated for any number of times without any limit for the present invention.

If with this configuration the absorbed current does not fall below acceptable levels, then the plant 1 is completely stopped in alarm conditions, and a user must intervene to restore it.

It is therefore evident that the complete shut-down occurs only in particular cases and that therefore the productivity of the plant 1 is certainly increased compared to the known equivalent plants.

Previously it has been said that the slowing down of the vibrations of the screen 4 is combined with a slowing down of the conveyor belt 5 in order not to overload the screen 4 itself. However, this may not be necessary and this action could unnecessarily decrease the processing yield of the plant 1.

Figure 4:
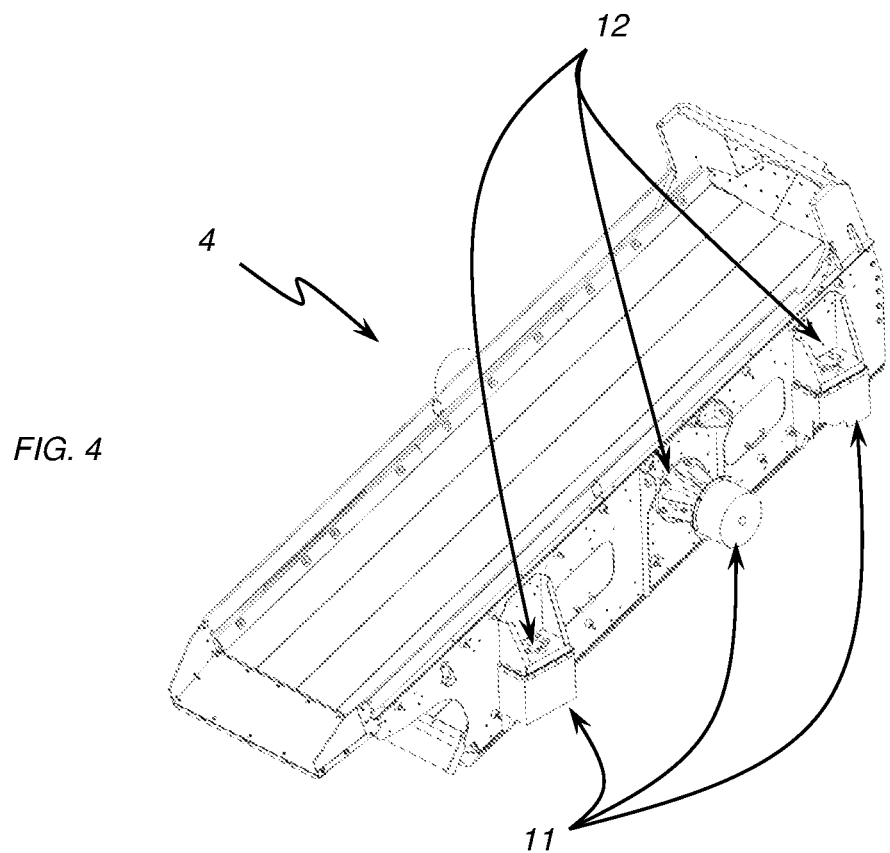

For this reason, as the screen 4 typically comprises, as can also be seen in the detail in FIG. 4, one or more rotary shafts 11 adapted to generate the vibration (the number of which is not a limiting characteristic for the present invention), according to another aspect of the invention, the plant 1 comprises accelerometric sensors 12 coupled to these rotary shafts 11 to measure the operation thereof.

Moreover, the control circuit 9 is operatively connected also to the accelerometric sensors 12 and to the conveyor belt 5 to vary the feed speed in the case the vibration measurements of the screen 4 could be different from predetermined values.

In other words, if the detected rotation value is different from the set value, it means that the screen 4 is overloaded. Only in this case the slowing down of the conveyor belt 5 is performed.

Since the primary object of the present invention is to avoid as far as possible the complete shut-down of the plant 1, according to another aspect of the invention, it also comprises a volumetric sensor 15 for measuring the residue lying on the conveyor belt 5. The latter, in fact, when it reaches the screen 4 could provoke its sudden overload, resulting in the forced shut-down of the whole plant 1.

This accumulation can be determined by the slowing down of the belt 5 due to problems of the crushing roll 2 and/or the screen 4, or to an excessive amount of material provided to the belt 5 by the crusher 2.

In any case, according to another aspect of the invention, the control circuit 9 is operatively connected to the volumetric sensor 15 and to the crusher 2 to vary its grinding speed in case the volume measurements are different from predetermined values.

This prevents the continuous accumulation of material on the belt 5 from requiring a complete shut-down of the plant.

For this reason it is clear that the method of the invention of controlling a treatment plant for elements to be recycled or disposed of, as well as the plant itself, achieve all the intended purposes.

In particular, the risk of having to completely stop the plant during processing is reduced, if not eliminated at all.

Furthermore, the need for the presence of specialized personnel within the plant is avoided or minimized.

More specifically, the processing efficiency of the plant of the invention controlled by the method of the invention is higher than the known equivalent plants, inter alia, also minimizing the costs in terms of personnel to be dedicated to its operation.

The invention may be subject to many changes and variations, which are all included in the appended claims. Moreover, all the details may furthermore be replaced by other technically equivalent elements, and the materials may be different depending on the needs, without departing from the scope of protection of the invention defined by the appended claims.

The invention claimed is:

1. A control method of a treatment plant for elements to be recycled or disposed comprising:
   at least one crushing roll for a reduction in size of the elements to be recycled or disposed, the at least one crushing roll being rotatable about a rotary shaft;
   at least one screen operatively arranged upstream of said crushing roll to allow passage to said crushing roll only of elements having a size larger than a predetermined size; and
   a conveyor belt operatively arranged upstream of said screen for conveying and transferring the elements to be recycled or disposed of,
   said method comprising:
   a measuring step of measuring current absorbed by said crushing roll; a comparing step of comparing a measured value of said absorbed current with a first predetermined value; a reducing step of reducing vibrations of said screen if said measured value exceeds said first predetermined value; a decreasing step of decreasing a feed speed of said conveyor belt simultaneously with said reducing step of vibrations of said screen; a stopping step of stopping said screen and said conveyor belt if said value of said measured value is higher than a second predetermined value; simultaneously to said stopping step of said screen and said conveyor belt, at least one first inversion step of inversing operation of said crushing roll; and a step of moving said crushing roll away from the elements if, after said at least one first inversion step of inversing the operation of said crushing roll, said value of said measured current remains above said first and said second predetermined values.

2. The control method according to claim 1, wherein said treatment plant further comprises a crusher operatively arranged upstream of said conveyor belt for a first roughing out of the size of the dements to be recycled or disposed of, said method further comprising a stopping step of stopping said crusher simultaneously with said stopping step of stopping said screen and said conveyor belt.

3. The control method according to claim 1, further comprising at least one second inversion step of inversing the operation of said crushing roll after said first inversion step.

* * * * *